United States Patent
Dole (10) Patent No.: US 7,828,339 B2
(45) Date of Patent: Nov. 9, 2010

(54) BANDED FLEXIBLE PIPE COUPLING

(75) Inventor: Douglas R. Dole, Whitehouse Station, NJ (US)

(73) Assignee: Victaulic Company, Easton, PA (US)

(*) Notice: Subject to any disclaimer, the term of this patent is extended or adjusted under 35 U.S.C. 154(b) by 227 days.

(21) Appl. No.: 11/848,539

(22) Filed: Aug. 31, 2007

(65) Prior Publication Data

US 2008/0054634 A1 Mar. 6, 2008

Related U.S. Application Data

(60) Provisional application No. 60/842,699, filed on Sep. 6, 2006.

(51) Int. Cl.
*F16L 23/00* (2006.01)
(52) U.S. Cl. .................... 285/368; 285/281; 285/364
(58) Field of Classification Search .............. 285/104, 285/278, 281, 339, 341, 342, 343, 348, 369, 285/370, 371, 372, 373, 412, 413, 414, 415, 285/417, 418, 905, 368, 416, 406, 364

See application file for complete search history.

(56) References Cited

U.S. PATENT DOCUMENTS

| | | | |
|---|---|---|---|
| 3,165,339 A | 1/1965 | Faccou | |
| 3,198,559 A * | 8/1965 | Snyder | .................. 285/233 |
| 3,223,438 A * | 12/1965 | De Cenzo | .................. 285/233 |
| 3,301,577 A | 1/1967 | Latham | |
| 3,419,290 A | 12/1968 | Campbell et al. | |

(Continued)

OTHER PUBLICATIONS

PCT/US07/19132, Apr. 2008, ISR/Written Opinion.

(Continued)

*Primary Examiner*—James M Hewitt
*Assistant Examiner*—Jay R Ripley
(74) *Attorney, Agent, or Firm*—Ballard Spahr LLP (57) ABSTRACT

A coupling assembly is disclosed for joining pipe elements to one another end-to-end. First and second rings are attached to an end of each pipe element. Each ring has an outwardly facing surface with a groove which receives a sealing member. A band is positioned in overlying relation surrounding the rings when the pipe ends are arranged in end-to-end relationship. The band has an inwardly facing surface engaged with the sealing members. The band also has oppositely disposed end faces. End plates are attached to each end face. The end plates project radially inwardly in overlapping engagement with the rings to retain the pipe elements in end-to-end relation within the band.

8 Claims, 8 Drawing Sheets

U.S. PATENT DOCUMENTS

| | | | |
|---|---|---|---|
| 3,740,082 A | | 6/1973 | Schustack |
| 3,951,439 A | * | 4/1976 | Schmunk ................. 285/124.5 |
| 4,003,590 A | | 1/1977 | Hefel |
| 4,070,046 A | | 1/1978 | Felker et al. |
| 4,372,586 A | * | 2/1983 | Rosenberg et al. ..... 285/148.27 |
| 4,418,947 A | * | 12/1983 | Talafuse ..................... 285/276 |
| 4,448,448 A | * | 5/1984 | Pollia .......................... 285/112 |
| 4,569,542 A | | 2/1986 | Anderson et al. |
| 4,619,470 A | | 10/1986 | Overath et al. |
| 4,702,498 A | | 10/1987 | Mueller et al. |
| 4,808,117 A | * | 2/1989 | Gale et al. .................. 439/192 |
| 5,078,435 A | | 1/1992 | Heyl |
| 5,131,689 A | | 7/1992 | Bates |
| 5,150,929 A | | 9/1992 | Greatorex |
| 5,188,400 A | * | 2/1993 | Riley et al. ................. 285/233 |
| 6,168,210 B1 | | 1/2001 | Bird |
| 6,394,507 B1 | | 5/2002 | Baker |
| 6,481,762 B1 | | 11/2002 | Rex et al. |
| 6,840,545 B2 | | 1/2005 | Schulte-Ladbeck et al. |
| 6,905,144 B2 | * | 6/2005 | Vila ............................ 285/223 |
| 7,052,050 B2 | | 5/2006 | Matzen |
| 2002/0074800 A1 | | 6/2002 | Baker |

OTHER PUBLICATIONS

PCT/US07/19132, Mar. 2009, Int'natl. Prelim. Report on Patentability.

\* cited by examiner

BANDED FLEXIBLE PIPE COUPLING

CROSS REFERENCE TO RELATED APPLICATION

This application is based on and claims priority to U.S. Provisional Application No. 60/842,699, filed Sep. 6, 2006.

FIELD OF THE INVENTION

This invention concerns mechanical pipe couplings for joining pipes together, and especially couplings allowing axial, torsional and angular flexibility between the pipes.

BACKGROUND OF THE INVENTION

Piping networks for conveying fluids (liquids, gases, powders, slurries, sludges and the like) are used in a wide spectrum of industries including the petroleum industry, the chemical industry, mining, construction, manufacturing, as well as in municipal water service. It is advantageous to assemble piping networks using pipe segments sealingly joined to one another with mechanical fittings. Mechanical fittings typically comprise couplings that engage the pipe ends and are held together by removable fasteners.

Mechanical fittings are advantageous because they avoid the use of open flame or electrical arc, as required in welding, to effect a fluid tight joint between pipe ends. The assembly of mechanical fittings requires less skill than welded or brazed joints, and they are, therefore, less expensive to install. Mechanical fittings also provide greater versatility for modification or repair of the piping network since repairs can be effected or new sections can be added by simply unbolting existing couplings and making the new connections as desired.

A problem common to many piping networks is the lack of joint flexibility axially (lengthwise along the pipe), torsionally (rotation about the long axis of the pipe) and angularly (the relative angle between one pipe and another to which it is connected). Rigid joints mean that the tolerances to which the pipes are cut and the angles at which they are joined must be maintained within relatively close limits so that the piping network will fit together as designed, without significant deviation from the plan. It is expensive and not always possible to maintain the necessary tight tolerances on pipe lengths, especially when the networks are assembled in the field as opposed to in a workshop where conditions for cutting and assembly are under greater control.

Flexible pipe joints are also advantageous for piping networks that must expand or contract and yet maintain fluid-tight connections. In one example, a piping network for the pneumatic transport of pulverized coal from the coal pulverizer to the furnace in a power plant must have enough flexibility to maintain its connection to the furnace, which expands in size when in operation due to the heat generated when the coal is burned.

Furthermore, pipes in a chemical plant or refinery, for example, that carry fluids that are hotter or colder than ambient conditions, are subject to cycles of heating and cooling, and the associated changes in length that such cycles occasion. These piping networks typically require multiple expansion joints or loops to avoid over-stressing the pipes due to expansion and contraction, especially for long pipe runs. Pipes joined by flexible couplings readily accommodate the deflections due to thermal expansion and contraction and thereby eliminate the need for special expansion joints or loops in the network.

Piping networks may also be subject to significant motion, for example, when built over seismically active regions of the earth. Deflections of pipes during tremors and earthquakes may be accommodated by flexible couplings that maintain the fluid integrity of the joints.

There is clearly a need for pipe couplings which provide a degree of flexibility to the joints of a piping network that will enable the network to be assembled in the field, according to design, without maintaining close tolerances or the need for modifications that deviate from the plan substantially, and accommodate thermal expansion and contraction as well as other deflections without compromising the integrity of the joints.

SUMMARY OF THE INVENTION

The invention concerns a coupling assembly for joining pipe elements to one another end-to-end, and a pipe joint formed by the coupling assembly. The coupling assembly comprises a first ring attachable to an end of one of the pipe elements. The first ring receives and surrounds the one pipe element and has an outwardly facing circumferential groove therein. A first sealing member is positionable within the groove of the first ring and extends circumferentially therearound. A second ring is attachable to an end of another of the pipe elements. The second ring receives and surrounds the other pipe element and has an outwardly facing circumferential groove therein. At least one of the rings may be tapered. A second sealing member is positionable within the groove of the second ring and extends circumferentially therearound. A band receives and surrounds the first and second rings. The band has an inwardly facing surface sealingly engageable with the first and second sealing members. The band has first and second end faces oppositely disposed. A first end plate is attachable to the first end face, and a second end plate is attachable to the second end face. The end plates project radially inwardly from the band in overlapping engagement with the first and second rings thereby retaining the pipe elements in end-to-end relation within the band. At least one of the end plates may have a shoulder facing and being engageable with one of the rings.

The end plates may be removably or permanently attached to the band. Threaded fasteners may be used for removably attaching the end plate or plates to the band. The end plates may comprise a single unitary piece which extends fully around the pipe element or a plurality of segments.

In an alternate embodiment, the band comprises first and second hoops. The first hoop includes the first end face and a radially extending first flange located opposite to the first end face. The second hoop includes the second end face and a radially extending second flange located opposite to the second end face. The flanges are positionable in facing relation and attachable to one another for attaching the hoops to one another to form the band.

A gasket is sealingly positionable between the first and second flanges for sealing the joint formed by the assembly. The end plates may be removably or permanently attached to the end faces and may comprise single unitary pieces which extend fully around the pipe elements or each may comprise a plurality of segments.

The invention also includes a method of attaching pipe elements to one another end-to-end. The method comprises:

(a) attaching a first ring to one pipe element, the first ring having an outwardly facing circumferential groove therein;

(b) attaching a second ring to another pipe element, the second ring also having an outwardly facing circumferential groove therein;

(c) inserting the first ring through a circumferentially extending band such that the band does not overlie the circumferential groove in the first ring;

(d) positioning a first sealing member within the groove of the first ring;

(e) positioning a second sealing member within the groove of the second ring;

(f) bringing the first and second rings adjacent to one another in co-axial alignment;

(g) sliding the band axially over the rings, the band having an inwardly facing surface sealingly engaging the first and second sealing members; and (h) attaching a plurality of end plates to opposite end faces of the band, the end plates engaging the rings and retaining the pipe element in end-to-end relation within the band.

DETAILED DESCRIPTION OF THE EMBODIMENTS

Figure 1:
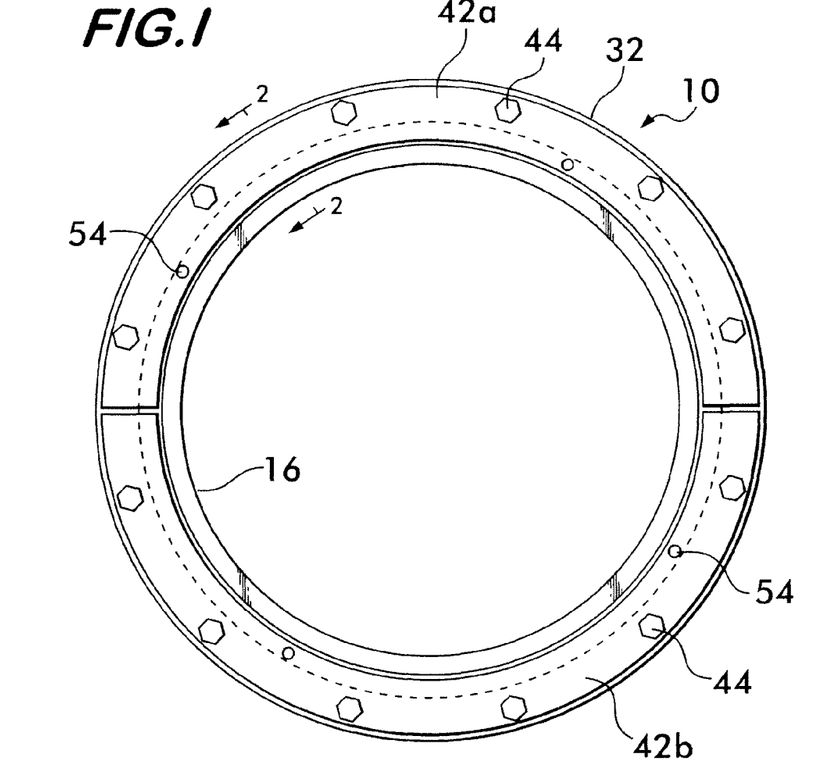
FIG. 1 is an axial view of a pipe coupling assembly according to the invention.
Figure 2:
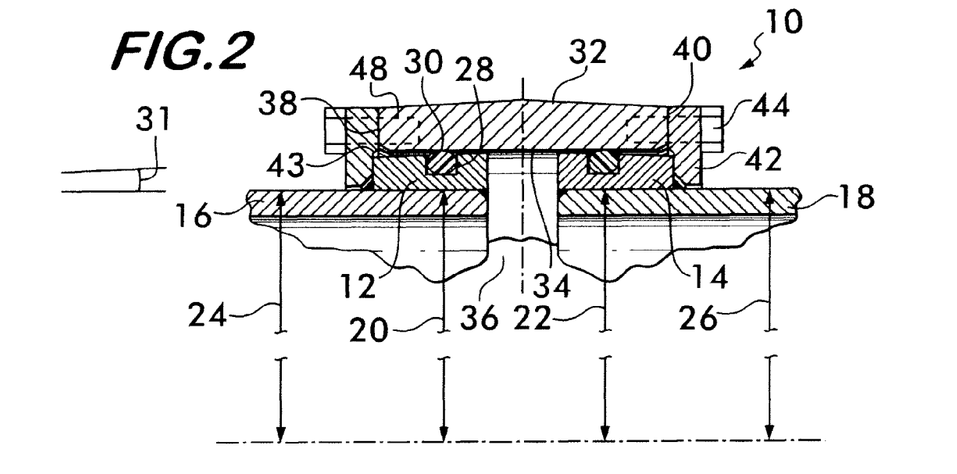
FIGS. 2-5 and 2A are cross-sectional views taken at line 2-2 of FIG. 1.

FIG. 1 shows an axial view of a coupling assembly 10 according to the invention. The coupling assembly connects pipe elements in end-to-end relation. As shown in FIG. 2, coupling assembly 10 comprises first and second rings 12 and 14 which are attached to the ends of pipe elements 16 and 18. Rings 12 and 14 have inner diameters 20 and 22 that are larger than the outer diameters 24 and 26 of the pipe elements so that the pipe elements may be inserted coaxially within respective rings as shown. The rings are attached to the pipe elements, preferably by welding, although brazed as well as threaded rings are also feasible. Alternately, the rings could be integrally formed with the pipe elements, for example, as a radially projecting circumferential flange.

Figure 3:
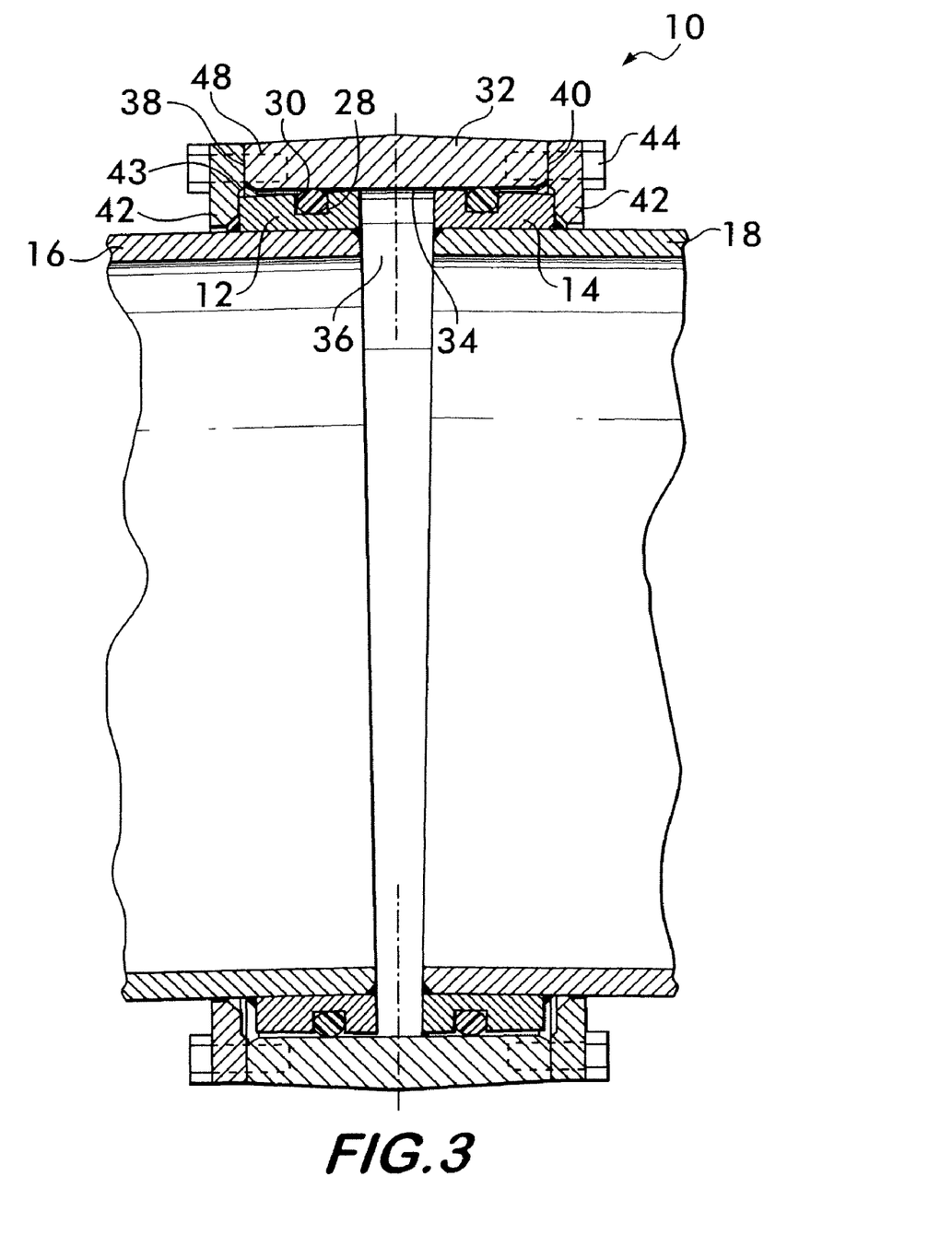

Each ring 12 and 14 has an outwardly facing circumferential groove 28 which receives a sealing member 30, in this example an O-ring. The rings are preferably coaxially received by a band 32. Band 32 has an inwardly facing surface 34 positioned at a diameter so that it sealingly contacts the sealing members. Band 32 furthermore is sufficiently wide so that it overlies both rings 12 and 14 when there is a predetermined gap 36 between the ends of pipe elements 16 and 18. FIG. 3 shows the pipe elements 16 and 18 axially and angularly displaced from one another. It is advantageous to taper at least a portion of the rings 12 and 14 between the sealing member 30 and the end plates 42 relative to the axis of the pipe elements 16 and 18 to provide clearance for relative angular deflection of the pipe elements so as to prevent binding and possible damage to the inside surface 34 of band 32 to ensure a fluid tight engagement between the sealing members 30 and the band 32. A taper angle 31 (see FIG. 2) of about 2° for each ring is preferred so as to provide a total angular deflection of about 4° between the pipe elements 16 and 18.

Figure 11:
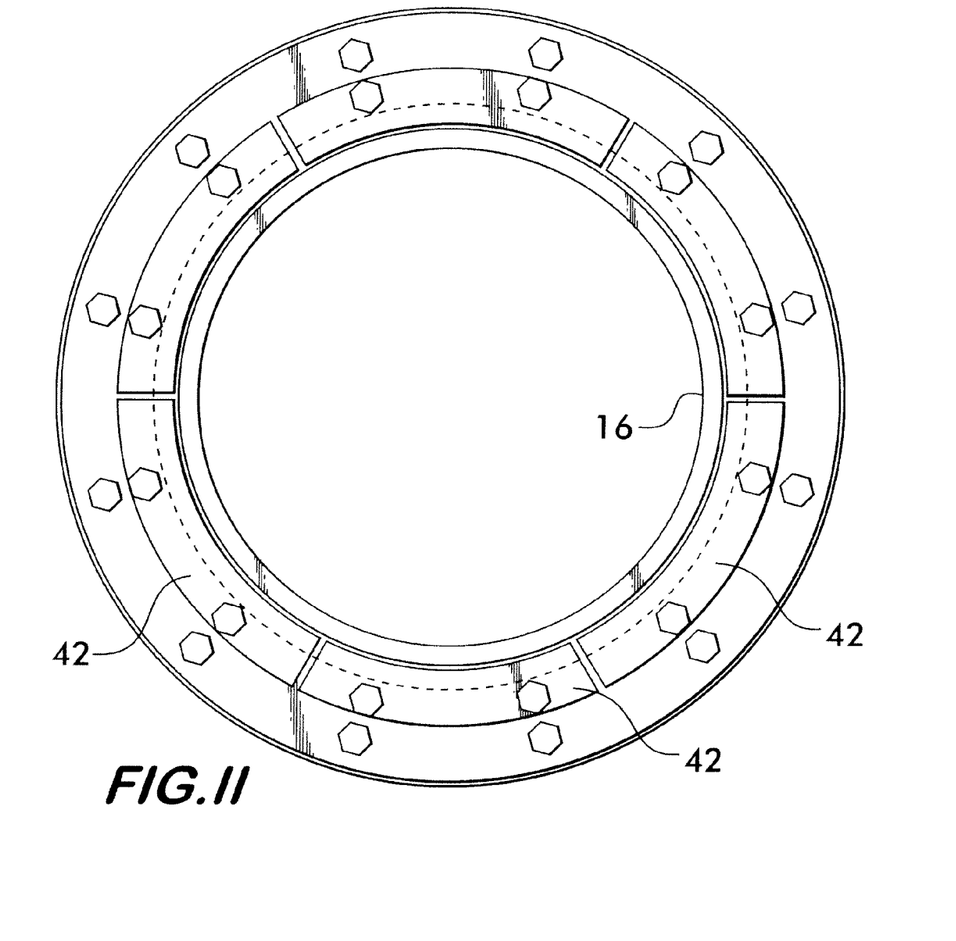
FIG. 11 is an axial view of another embodiment of a pipe coupling according to the invention.
Figure 12:
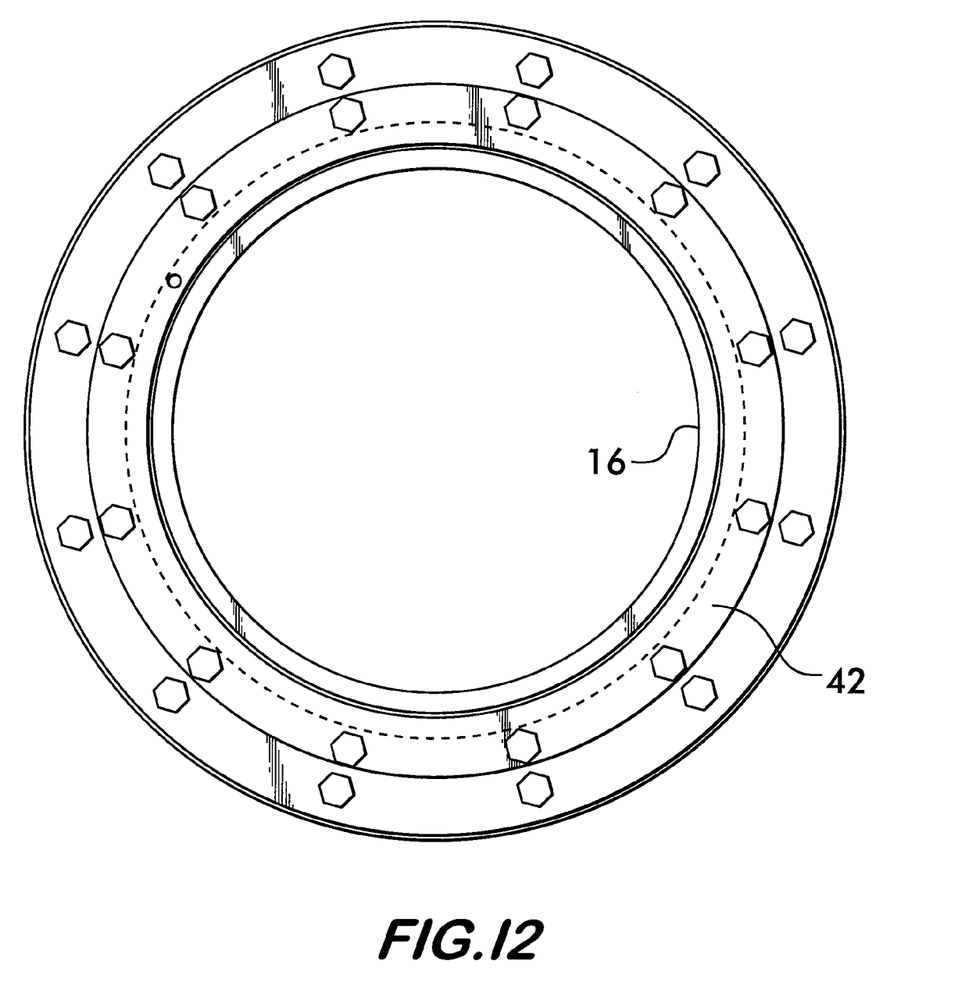
FIG. 12 is an axial view of another embodiment of a pipe coupling according to the invention.

Band 32 also has first and second end faces 38 and 40 disposed opposite to one another. A plurality of end plates 42 are attached to the end faces, preferably by threaded fasteners 44. End plates 42 project radially inwardly and overlap the rings 12 and 14. Engagement between the rings and the end plates retains the pipe elements in end-to-end relation within the band 32. As best shown in FIG. 1, there may be two end plates 42a and 42b attached to an end face 38, each end plate subtending a substantially circular arc of about 180°. Other embodiments, such as the one shown in FIG. 11, may have more than two end plates per end face of the band. FIG. 12 illustrates an embodiment wherein the end plate 42 is a single unitary piece that extends a full 360°. Multiple end plate embodiments are advantageous compared with the unitary end plate however, because they allow the coupling assembly to be assembled without access to a free end of a pipe element that also does not have a ring attached to it.

Figure 2A:
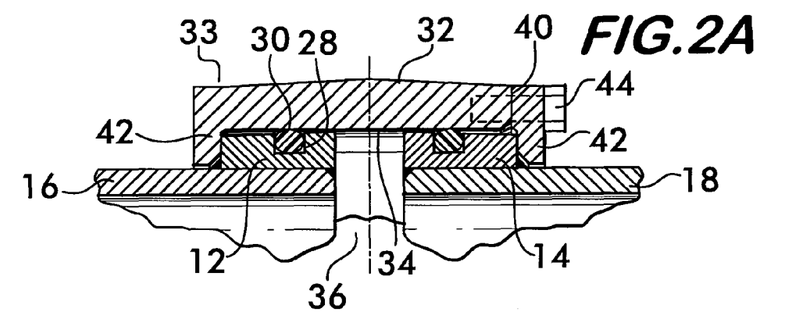

Although it is preferred that both end faces 38 and 40 have removably attached end plates 42, in another embodiment, shown in FIG. 2A, one or more end plates 42 are removably attached to one of the end faces 40, for example, by fasteners 44. At the opposite end 33 of the band 32, the end plate 42 is integrally formed with the band or otherwise attached, for example, by welding, so as to be non-removable.

Figure 4:
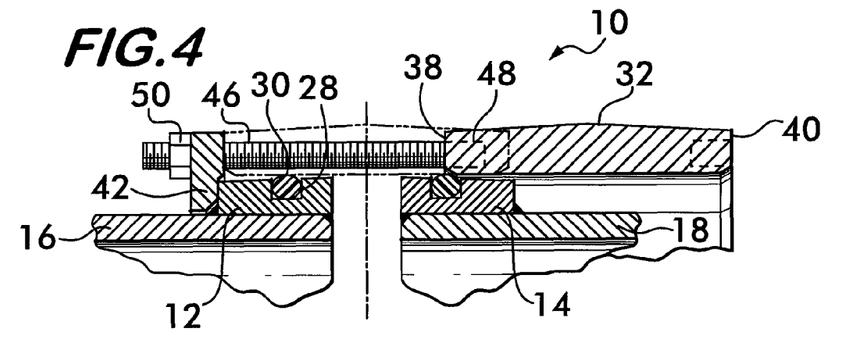

Assembly of the coupling assembly according to the invention is described with reference to FIG. 4. Pipe elements 16 and 18 have rings 12 and 14 welded at or near their respective ends as shown, and the band 32 is slipped over one of the pipe elements, in this example 18, to a point wherein the circumferential groove 28 in the ring 14 is exposed. The sealing members 30 are not yet present in grooves 28 to allow the band to slip easily over the ring 14. Respective sealing members 30 are next fitted within the grooves 28 of each ring and the pipe elements are brought into coaxial, end-to-end relation. To prevent damage to the sealing members, three or more threaded shafts 46 (only one of which is shown), substantially equally spaced circumferentially, are passed through one or more end plates 42 that are engaged with the ring 12 on pipe element 16. The threaded shafts are each engaged with a respective one of the threaded holes 48 in the end face 38 of the band 32 that would otherwise receive the threaded fasteners 44 that attach the end plate 42 to the end face 38 of the band. Drive nuts 50 are threaded onto the shafts 46. As the nuts 50 are tightened, they engage the end plate 42 and draw the shaft toward the pipe element 16, dragging the band 32 axially over the rings 14 and 12, the band compressing the sealing members 30 and effecting a fluid tight joint. The shafts 46 and drive nuts 50 are used to provide a mechanical advantage when moving the band because it is difficult to force the band over the rings 12 and 14 by hand due to the amount of force required to compress the sealing members 30. For embodiments having a plurality of end plates, it may be advantageous to use more than three substantially equally spaced shafts 46 and drive nuts 50, tightening each one a limited amount in turn so that the band 32 is drawn over the rings substantially without significant angular deflection relatively to the longitudinal axis of the pipe elements. The use of multiple shafts prevents cocking of the band, thereby avoiding damage to the sealing members 30 as well as binding of the band, which can cause damage to the band's inwardly facing surface and thereby potentially compromise the fluid tightness of the joint. Multiple shafts also prevent cocking of the end plates, further reducing the chance of shaft binding when tightened.

To further prevent damage to the sealing member 30, the end plates 42 may have a shoulder 43 positioned facing the rings 12 and 14. When one of the drive nuts 50 is turned, the band 32 has a tendency to cock toward the center of the pipe elements 16 and 18. If this angular displacement is not limited the shaft 46 of the nut that is tightened may contact the sealing member and saw partially through it as the shaft draws the band 32 over the rings 12 and 14. The shoulder 43 in the end plate engages the ring 12 and limits the angular displacement of the band 46 and the shaft 46.

Figure 5:
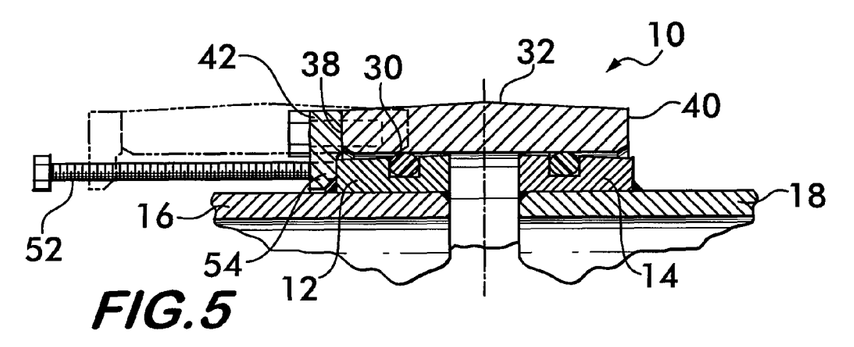

Disassembly of the joint is described with reference to FIG. 5. End plates are removed from end face 40 of band 32, and three or more threaded shafts 52 (only one of which is shown) are engaged with respective threaded holes 54 in the end plate or plates 42 attached to the end face 38 of the band 32. Holes 54 are aligned with ring 12 so that rotation of the shafts 52 will push against the ring and draw the band off of the rings 12 and 14, exposing the sealing members 30 as illustrated in phantom line. The sealing members may then be removed and replaced or other repairs may be effected.

Figure 6:
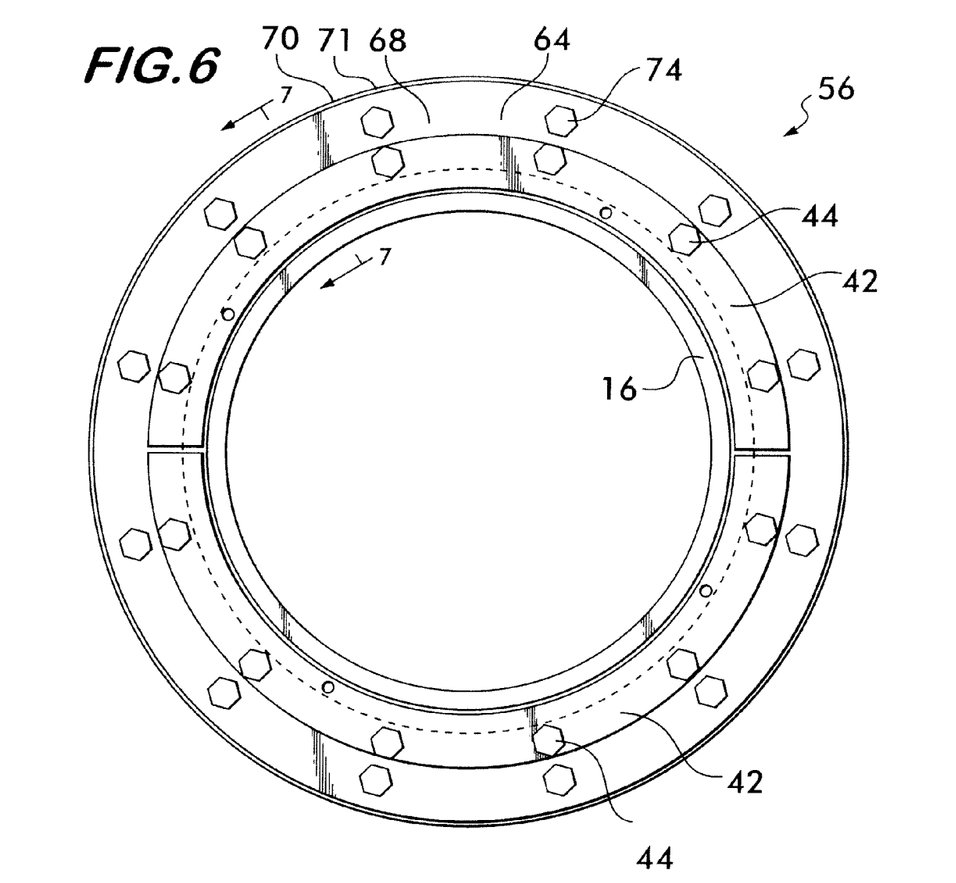
FIG. 6 is an axial view of another embodiment of a pipe coupling according to the invention.
Figure 7:
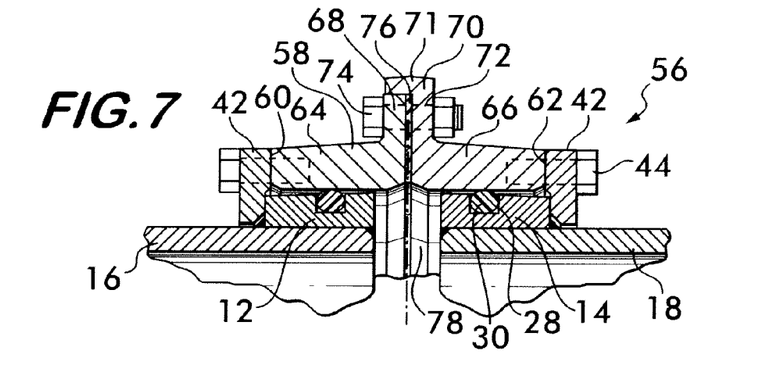
FIGS. 7-10, 7A and 7B are cross-sectional views taken at line 7-7 of FIG. 6.

Another embodiment of a coupling assembly according to the invention is shown in FIGS. 6 and 7. Coupling assembly 56 comprises rings 12 and 14 attached to or integrally formed with pipe elements 16 and 18, the rings having grooves 28 that receive sealing members 30. The rings and sealing members are surrounded by a band 58 with end faces 60 and 62 to which are attached end plates 42 via fasteners 44 to retain the pipe elements in end-to-end relation within the band. Band 58 is comprised of first and second hoops 64 and 66. Hoop 64 includes end face 60 and a radially extending flange 68 positioned opposite to the end face 60. Hoop 66 includes end face 62 and a radially extending flange 70 positioned opposite to the end face 62. The flanges 68 and 70 may be brought into facing relation to join the hoops to one another and form the band 58. The flanges have holes 72 that align with one another to accept threaded fasteners such as bolts 74 to fix the hoops to one another and form the band 58. Flange 70 may have a lip 71 that projects axially toward the flange 68. Lip 71 may be circumferentially continuous or intermittent around the flange and has an inner diameter that is sized to receive the mating flange 68 to help position and maintain the hoops concentric with one another. To ensure fluid tightness of the joint, a gasket 76 may be positioned between the flanges.

Figure 8:
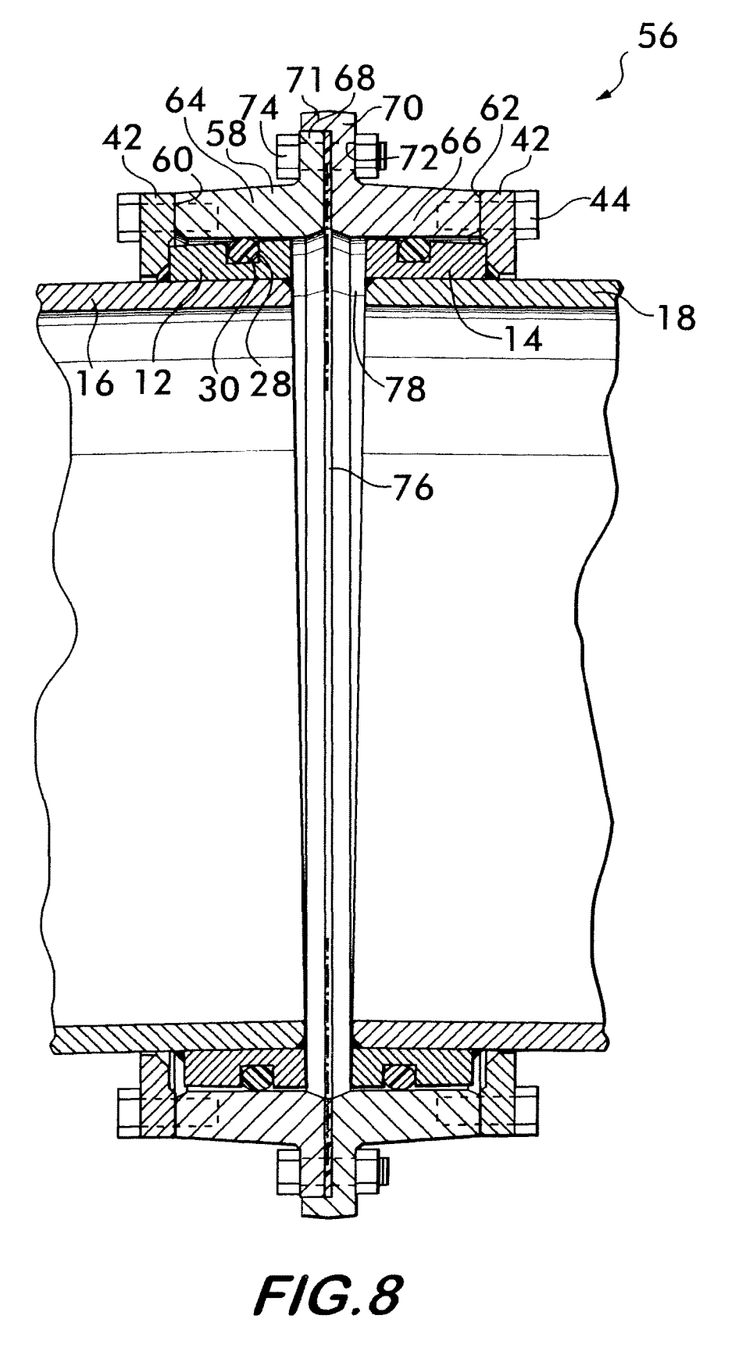

Band 58, when assembled from hoops 64 and 66, is sufficiently wide so that it overlies both rings 12 and 14 when there is a predetermined gap 78 between the ends of pipe elements 16 and 18. FIG. 8 shows the pipe elements 16 and 18 axially and angularly displaced from one another.

Figure 7A:
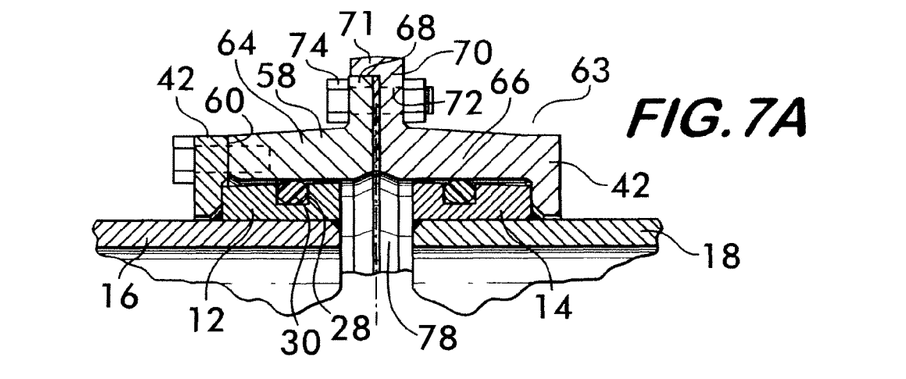
Figure 7B:
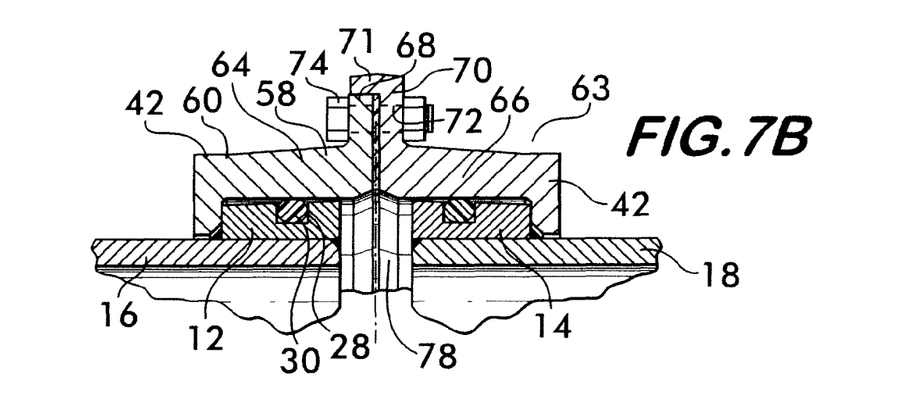

Although it is preferred that both end faces 60 and 62 have removably attached end plates 42, in another embodiment, shown in FIG. 7A, one or more end plates 42 may be removably attached to one of the end faces 60, for example, by fasteners 44. At the opposite end 63 of the band 58, the end plate 42 may be integrally formed with the band (hoop 66) or otherwise attached, for example, by welding, so as to be non-removable. It is also feasible to have integrally formed end plates 42 on both ends of band 58 for the hoop embodiment as shown in FIG. 7B.

Figure 9:
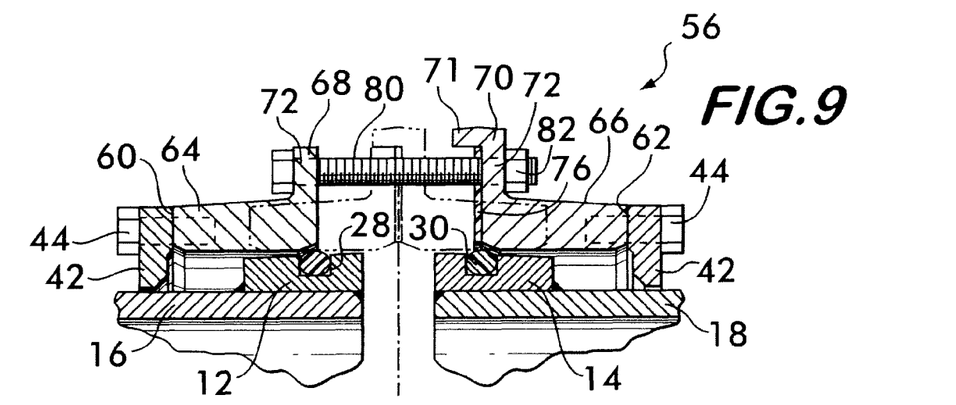

Assembly of the coupling assembly 56 is described with reference to FIG. 9. Rings 12 and 14 are attached to pipe elements 16 and 18. Hoop 64 is then positioned coaxially surrounding ring 12 with groove 28 exposed. Similarly, hoop 66 is positioned coaxially surrounding ring 14 with groove 28 in that ring exposed. Next, using bolts 44, end plates 42 are attached to the end faces 60 and 62 of hoops 64 and 66 respectively. Sealing members 30 are positioned in grooves 28 in each ring 12 and 14. The pipe elements are positioned in end-to-end relation with the flanges 68 and 70 in facing relation. The gasket 76 is positioned so that it engages one of the flanges and hoops 64 and 66 are rotated about the longitudinal axes of the pipe elements so that the holes 72 in the flanges are aligned. A number of elongated bolts 80 are passed through aligned holes 72 in each flange 68 and 70. There are preferably four elongated bolts spaced at equal angular intervals about the flanges. Nuts 82 are engaged with the bolts 80, and when the bolts are tightened (gradually, in alternating turns between bolts) the hoops 64 and 66 are drawn toward one another, compressing the sealing members 30 and bringing the flanges into engagement with the gasket 76 as shown in phantom line. Shorter length bolts 74 (see FIG. 7) are then used to attach the flanges to one another, forming the band 58, compressing the gasket 76 and ensuring a fluid tight joint. Having served their function to draw the hoops together the elongated bolts 80 are removed and replaced with the shorter bolts 74.

Figure 10:
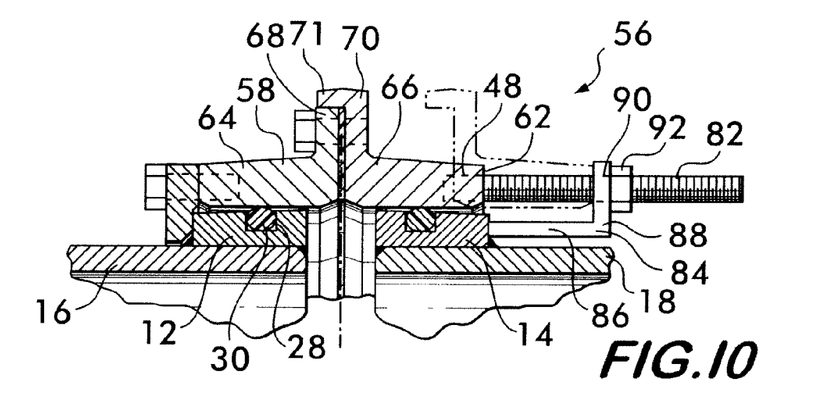

FIG. 10 shows a method of disassembling the coupling assembly 56. Bolts 74 are removed from flanges 68 and 70. The end plates 42 are removed from an end face 62 of band 58, and several (preferably 4) jackscrews 82 are engaged with threaded holes 48 in the end face 62. A drawing tool 84 comprising a finger 86 attached to a base plate 88 is slidably mounted on the jackscrew. Base plate 88 has an opening 90 that receives the jackscrew. The finger 86 is engaged against the ring 14 and a nut 92 is threaded onto the jackscrew behind the base plate 88. When the nut is tightened, it draws the hoop 66 out of engagement with the hoop 64 and across the ring 14 to the position shown in phantom line. Preferably, multiple jackscrews and drawing tools are used to minimize angular deflection between the hoop and the pipe element 18 and avoiding cocking of the hoop and jamming on the ring. The opposite hoop 64 is removed in the same manner. It is further noted that disassembly of the coupling assembly embodiment 56 could also be effected using a jackscrew engaging a threaded hole in the end plate as described above with respect to FIG. 5 for the embodiment 10 comprising a one piece band 32. Similarly, the coupling assembly 10 could be disassembled using the drawing tool 84 as described for the coupling assembly 56.

What is claimed is:

1. A coupling assembly joining pipe elements to one another end-to-end, said coupling assembly comprising:

a first ring fixedly attached to an end of one of said pipe elements, said first ring receiving and surrounding said one pipe element and having an outwardly facing circumferential groove therein;

a first sealing member positioned within said groove of said first ring and extending circumferentially therearound;

a second ring fixedly attached to an end of another of said pipe elements, said second ring receiving and surrounding said other pipe element and having an outwardly facing circumferential groove therein;

a second sealing member positioned within said groove of said second ring and extending circumferentially therearound;

a band receiving and surrounding said first and second rings, said band having an inwardly facing surface sealingly engaged with said first and second sealing members, said band having first and second end faces oppositely disposed; and a plurality of separate first end plates attached to said first end face, and a plurality of separate second end plates attached to said second end face, said separate end plates being attached to said end faces using a plurality of threaded fasteners extending between said separate end plates and said end faces, said separate end plates projecting radially inwardly from said band in overlapping engagement with said first and second rings thereby retaining said pipe elements in end-to-end relation within said band.

2. A coupling assembly according to claim 1, comprising only two said first end plates.

3. A coupling assembly according to claim 1 wherein one of said end plates has a plurality of threaded holes aligned with said rings.

4. A coupling assembly according to claim 1, wherein at least one of said rings is tapered.

5. A coupling assembly according to claim 1, further comprising a shoulder positioned in at least one of said end plates, said shoulder facing and being engageable with one of said rings.

6. A pipe joint comprising:
- a first pipe element having a first ring fixedly attached to an end thereof, said first ring receiving and surrounding said first pipe element and having an outwardly facing circumferential groove therein;
- a first sealing member positioned within said groove of said first ring and extending circumferentially therearound;
- a second pipe element having a second ring fixedly attached to an end thereof, said second ring receiving and surrounding said second pipe element and having an outwardly facing circumferential groove therein;
- a second sealing member positioned within said groove of said second ring and extending circumferentially therearound;
- a band receiving and surrounding said first and second rings, said band having an inwardly facing surface sealingly engaged with said first and second sealing members, said band having first and second end faces oppositely disposed; and
- a plurality of separate first end plates attached to said first end face, and a plurality of separate second end plates attached to said second end face, said separate end plates being attached to said end faces using a plurality of threaded fasteners extending between said separate end plates and said end faces, said separate end plates projecting radially inwardly from said band in overlapping engagement with said first and second rings thereby retaining said pipe elements in end-to-end relation within said band.

7. A pipe joint according to claim 6, comprising only two of said first end plates and only two of said second end plates.

8. A coupling assembly according to claim 6, wherein one of said first end plates has a threaded hole therethrough, said threaded hold being aligned with said first ring.

* * * * *

UNITED STATES PATENT AND TRADEMARK OFFICE
CERTIFICATE OF CORRECTION

| | |
|---|---|
| PATENT NO. | : 7,828,339 B2 |
| APPLICATION NO. | : 11/848539 |
| DATED | : November 9, 2010 |
| INVENTOR(S) | : Dole |

It is certified that error appears in the above-identified patent and that said Letters Patent is hereby corrected as shown below:

Claim 8, column 2, line 23, change word "hold" to "hole".

Signed and Sealed this
Eleventh Day of January, 2011

David J. Kappos
*Director of the United States Patent and Trademark Office*